June 6, 1933. G. B. BOGART Re. 18,862
TREATING HYDROCARBON OILS
Original Filed Feb. 17, 1927
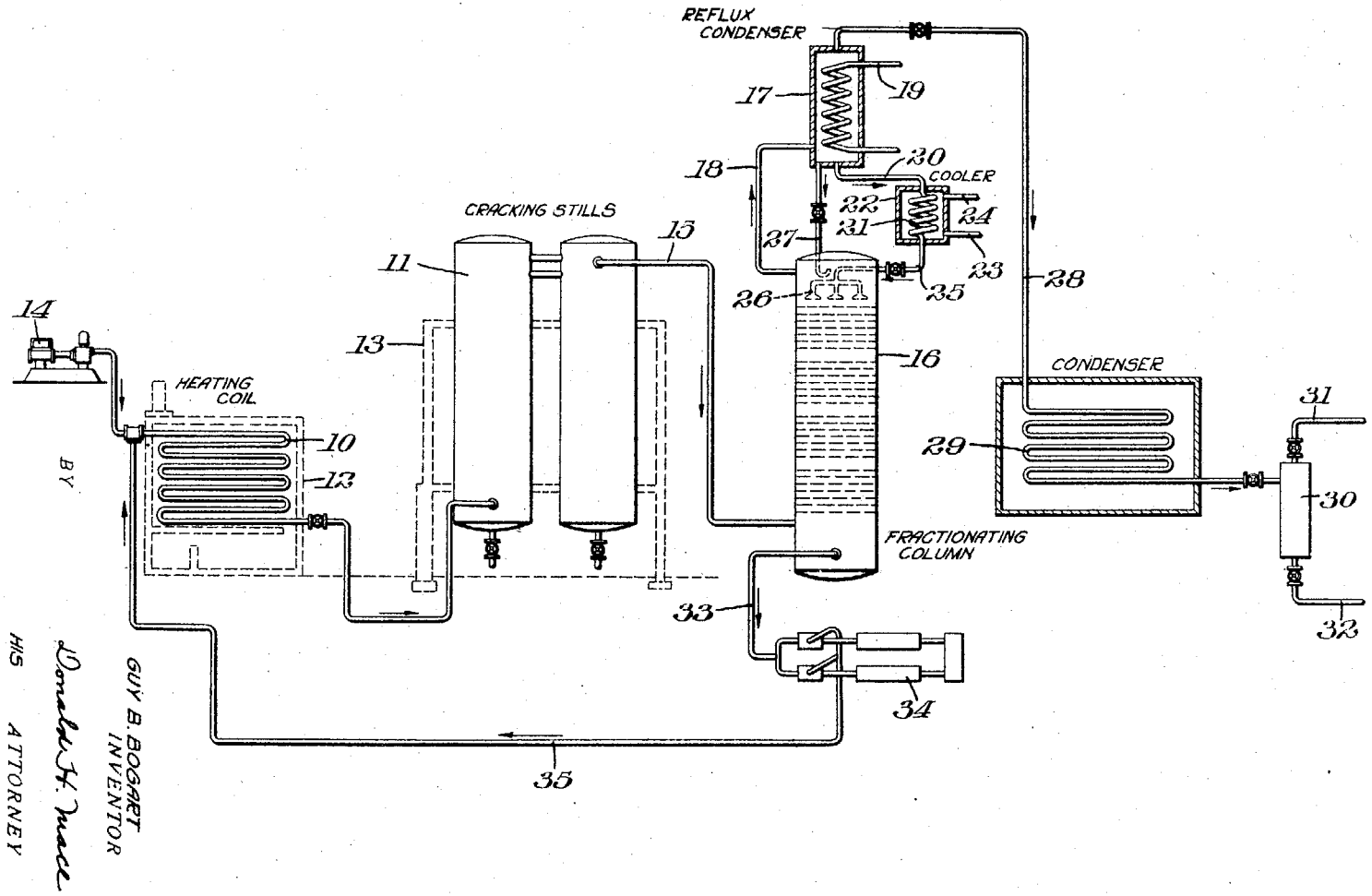

Reissued June 6, 1933 Re. 18,862

UNITED STATES PATENT OFFICE

GUY B. BOGART, OF LOCKPORT, ILLINOIS, ASSIGNOR, BY MESNE ASSIGNMENTS, TO THE TEXAS COMPANY, OF NEW YORK, N. Y., A CORPORATION OF DELAWARE

TREATING HYDROCARBON OILS

Original No. 1,709,304, dated April 16, 1929, Serial No. 168,941, filed February 17, 1927. Application for reissue filed October 1, 1932. Serial No. 635,872.

This invention relates to the fractionation of hydrocarbon oils and has particular reference to certain novel improvements in the manufacture of gasoline and similar hydrocarbon oil products.

It is an object of my invention to facilitate a close fractionation of the volatile products desired, or in other words, to carry on the fractionating operation in such a way as to enable the production of volatile distillates substantially free from undesirable higher boiling fractions.

Another object of my invention is to make possible a rapid rate of distillation without thereby injuriously affecting the quality of the distillate obtained.

Another object is to increase the capacity of fractionating equipment and to secure increased yields of properly fractionated distillates.

A still further object is to control the cooling applied to the tower, that is, the reflux medium supplied, in such a way that the extent or amount of cooling may be controlled without thereby affecting the volume of the liquid supplied, and in furtherance of this object the liquid condensate formed by condensing vapors taken off the fractionating column is cooled after its formation as a condensate, and thus by regulating the extent of cooling applied to this condensate the amount of cooling supplied to the column is controlled independently of the formation of the condensate to be used as such reflux medium and consequently the extent of cooling supplied to the column may be varied without changing the quantity of liquid supplied.

My invention contemplates a process wherein vapors evolved from a fractionating column are subjected to cooling to condense a portion thereof, the condensate cooled to a temperature below that of its formation as a condensate and the introduction of this cooled liquid into the fractionating column to serve as a reflux or cooling medium therein. In prior methods of fractionation the condensate from the reflux condenser has been passed directly to the fractionating column and it has thus been admitted to the column at a temperature substantially that of its formation as a condensate, or in other words, at temperatures approximating the temperature of vaporization. In this prior method of operation, the amount of cooling supplied to the fractionating column is controlled solely by regulating the amount of cooling applied to the reflux condenser, or in other words, by the amount of cooling employed in condensing the distillate. Such a method of operation has the serious limitation that the only way the cooling supplied to the column can be varied is by varying the cooling supplied to the condenser and consequently by varying the volume of the condensate produced. This has been a very serious limitation, particularly when it has been necessary to increase the amount of cooling supplied to the column since the added volume of distillate admitted to the column increased the volume of fluids cycling between the fractionating column and its reflux condenser, thus augmenting the carrying effect of the vapors so that heavier products than desired are carried over in the final distillate, thereby negativing the analyzing action which it is the very object of fractionation to secure. It has, in fact, at times been impossible to supply adequate cooling to the fractionating column in accordance with the old method due to the excessive volumes of liquid required to furnish the cooling.

In accordance with my invention, the reflux distillate is obtained by condensing a portion of the vapors evolved from the fractionating column and this distillate is supplied to the fractionating column at any temperature desired by carrying on the condensing operation or formation of the condensate in one step and the cooling of this condensate in a second step; and by supplying separate or independent cooling means in the condensing step and in the subsequent cooling step, or by independently controlling the cooling supplied in the condensing step and that supplied in the subsequent cooling step, it is possible to control the amount of cooling supplied to the column without thereby affecting the volume supplied; in other words, by varying the temperature to which the condensate is subjected, after its formation as such, the volume of liquid supplied to the column may remain constant while any degree of cooling desired is supplied to the column. It will be seen that the process of my invention facilitates a wide range of control in fractionating operations by regulating the temperature of the reflux condensate independently of its formation.

My invention makes it possible, as indicated, to supply adequate cooling with minimum volumes of reflux liquid employed. The practice of the invention thus reduces to a negligible minimum the carrying effect of the vapors passing from the fractionating column to the reflux condenser and thus facilitates a clean separation of the overhead distillate, even though the rate of distillation may be very rapid. This is an important advantage in cracking processes since the reduced volume cycling between the fractionating column and reflux condenser lessens to that extent the carrying over in the distillate of carbon or coky bodies.

My invention has a particular field of usefulness as applied in the pressure distillation of hydrocarbon oils such as in cracking processes used in the manufacture of gasoline. When reflux condensate is admitted to a fractionating column maintained under high superatmospheric pressure in the conventional way, that is, by returning the condensate from the reflux condenser directly to the fractionating column so that the liquid supplied is at a temperature very near its boiling point, excessive amounts of condensate are required to supply the required cooling due to the low latent heat of vaporization of hydrocarbons under high pressures. In the practice of my invention, wherein the reflux condensate is cooled after its formation as such, the temperature of the condensate may be readily lowered to temperatures materially below the vaporizing point. As a result, when this cooled liquid is contacted with the hot vapors in the column the resultant heat absorption includes both the heat required to raise the liquid to its boiling point and the heat required to vaporize the liquid; thus my invention enables the supply of adequate cooling to the column in fractionating systems operating under pressure and makes possible supplying to the fractionating unit maximum cooling with a minimum volume of reflux liquid.

My invention contemplates the provision of special apparatus adapted for fulfilling the objects hereinbefore set forth and for practicing the process described herein.

In order to more fully disclose the invention, reference will now be had to the accompanying drawing in diagrammatic sectional elevation which illustrates the invention as applied in a specific cracking process. It is to be understood, however, that the practice of the invention is not limited to the particular type of cracking equipment illustrated, the invention being adapted generally to the efficient fractionation of hydrocarbon oils.

In the apparatus thus illustrated, 10 represents a heating coil and 11 a battery of cracking stills. The coil is positioned in a heating chamber or furnace 12 and the stills are located in a heating chamber or furnace 13. The oil to be treated is charged from a suitable source by pump 14. The charging line from the pump is shown as communicating directly with the coil 10, but it is to be understood that the oil charge may, before being introduced to the coil 10, be passed through such heat economy or heat exchange elements as may be desired, such for example, as tar or vapor exchangers, or means for utilizing waste heat from either or both of the furnaces 12 and 13. In the specific cracking process described in detail herein it is contemplated that the oil will be raised to a cracking temperature in the heating coil 10 and then discharged into the stills or converters 11 where cracking or decomposition is carried on, the necessary temperature being maintained in the stills by means of the furnace 13 or by insulating the stills so that they will retain heat imparted to the oil in the coil 10. Obviously one still or converter may be used in lieu of a battery of stills but the battery operation has been shown as a type of equipment particularly well adapted for large scale commercial operations.

A vapor line 15 extends from the cracking stills to a fractionating column 16. The fractionating unit is formed of suitable means to facilitate adequate contact between the upwardly rising vapors and the downflowing liquid therein in order to fractionate or rectify the vapors received from the cracking stills. The column may, for example, be in the form of a bubble tower or a packed tower. The tower may be insulated to a greater or less extent, if desired, so as to protect it from the atmosphere and permit the cooling to be applied mainly or entirely from the means that is now to be described.

A reflux condenser 17 is provided for the fractionating column. A pipe 18 serves to conduct vapors from the fractionating column to the reflux condenser 17. The latter may assume various forms which are well known in the art. The cooling for the reflux condenser may be supplied by the atmosphere, by water or by the oil charge, or by other suitable means. In the diagrammatic representation of the reflux condenser shown, a cooling coil 19 is shown. A pipe 20 serves to remove the condensate from the reflux condenser and conduct it to a cooling coil 21. The coil 21 is contained in a chamber 22 which is supplied by a cooling medium such as water or other suitable liquid by the pipe 23. An overflow pipe 24 is provided for removing the cooling medium. A pipe 25 conducts the cooled liquid from the coil 21 to the fractionating tower 16. As illustrated, the pipe 25 terminates in a spraying device 26 for suitably spraying or distributing the liquid. It will be observed that the pipe 25 communicates with the upper portion of the fractionating column and it is generally preferable that this pipe discharge onto the top fractionating tray or element in the tower. As illustrated, the pipe 25 is provided with a valve. The reflux condenser may be equipped with a valve pipe 27 so that, if desired, a portion of the condensate from the reflux condenser may be passed directly to the fractionating tower.

A vapor line 28 extends from the reflux condenser to a condenser coil 29; this coil is preferably water cooled. If desired, the overflow pipe 24 may supply a portion of the cooling water required for the condenser 29. A convenient way to supply cooling to both the final condenser 29 and the cooling chamber 22 is to pump the water, or other cooling medium, to the cooling chamber 22 and supply the condenser 29 from the overflow through pipe 24, or water may be pumped directly to the final condenser with a certain amount by-passed into the pipe 23 and chamber 22 and allowed to overflow through the pipe 24 to the condenser box. A condensate receiver 30 is provided for collecting the distillate from the condenser 29, the receiver being provided with a valved gas outlet 31 and a valved distillate outlet 32. The fractionated liquid which collects at the bottom of the fractionating column 16 is removed by a pipe 33 by which it is conducted to a suitable hot oil pump 34 which forces the liquid through the line 35 into the coil 10.

In practicing the invention, the oil charge or a portion of it, may be passed through the pipe 19 so as to obtain heat exchange with the vapors in the reflux condenser 17, or the charge may be passed through a tar exchanger or such other heat exchange or heat economy apparatus as may be desired. In any case, the oil, after such preheating as is desired, is passed through the coil 10 wherein it is raised to a cracking temperature and is then discharged into the cracking stills 11 wherein decomposition and distillation takes place. The evolved vapors pass to the fractionating tower 16 wherein they are subjected to rectification or fractionation. The fractionated vapors pass from the tower through the pipe 18 to the condenser 17 wherein a portion of the vapors is condensed. The uncondensed vapors pass to the condenser 29 and the final distillate is collected in the receiver 30, while the condensate formed in the reflux condenser is admitted to the pipe 20 and is passed thence through the cooling coil 21. The amount of cooling supplied to the chamber 22 is regulated so that the condensate in the coil 21 is reduced in temperature to the extent desired. The admission of the cooled condensate to the fractionating column is regulated by the valve in the line 25.

It is apparent that my invention provides two separate means of controlling the quantity and character of the reflux distillate supplied to the fractionating tower, thus by regulating the cooling supplied to the condenser 17 the quantity of condensate formed is controlled, and by regulating the cooling supplied to the coil 20 the temperature of this liquid is controlled. It is possible to vary the extent of cooling in the fractionating tower without thereby affecting the quantity of reflux liquid supplied; thus the cooling medium supplied to the coil 19 may be regulated so as to maintain a substantially constant rate of condensate formation in the condenser 17 and with the valve in the line 27 closed and the valve in the line 25 open the reflux liquid may be run through the coil 21 and thence through the line 25 into the fractionating column, the temperature to which the liquid is cooled in the coil 21 being regulated to obtain the desired amount of cooling in the column 16. Or, if desired, part of the liquid condensate may be conducted through the pipe 27 and part through the pipe 20, coil 21 and pipe 25 and by regulating the quantity of liquid passed through the coil 21 the desired cooling is supplied to the column 16. It is apparent that when the pipe 27 is used the degree of cooling applied to the column may be controlled either by the quantity of liquid passed through the coil 21 or by the temperature to which the liquid is reduced in that coil or by both regulating the quantity passed through and the temperature to which the liquid is cooled. If all the reflux liquid be conducted through the pipe 20 and the coil 21 the extent of cooling applied to the column is determined by the temperature to which the liquid is cooled in the coil 21, although, if desired, the quantity of reflux distillate formed may, of course, be varied by regulating the cooling medium supplied to the coil 19. In one method of operation the oil charge or other cooling medium is first passed through the chamber 22 to cool the condensate in the coil 21 and is then passed through the coil 19 to cause condensation of vapors in the condenser 17, and in the method of operation, if the quantity of cooling medium passed through the chamber 22 and coil 19 be the same, it is preferable to control the cooling applied to the fractionating column 16 by apportioning the quantities of liquid run back through the respective pipes 27 and 25.

A specific example to indicate the temperature that may be applied in the process may be given as follows: In a pressure distillation process, with the fractionating column 16 and the final condenser 29 under superatmospheric pressure and a gasoline distillate of about 400° F. end point being collected in the receiver 30, the temperature in the bottom of the fractionating tower was about 740° F.; the temperature of the vapors leaving the reflux condenser 17 about 445° F.; the temperature of the hot condensate passing through the pipe 20 about 440° to 500° F. and the temperature of the cooled liquid passing through the pipe 25 about 180° F. It is to be understood that applicant does not intend by giving these specific temperatures to thereby limit the scope of his invention, these specific temperatures being given for the purpose of an example merely. The temperatures obtaining in different parts of the fractionating equipment and the temperature to which the reflux liquid is cooled will obviously vary with the different conditions encountered, such as the boiling point of the gasoline or other distillate desired, the composition of the vapors entering the fractionating column and other variable factors as will be well understood by those skilled in the art.

Although the preferred embodiment of the invention has been set forth in connection with apparatus having a particular construction and arrangement of parts and mode of operation, it is obvious that various changes and modifications may be made therein, while securing to a greater or less extent some or all of the benefits of the invention, without departing from the spirit and scope thereof. Therefore, only such limitations should be imposed as are indicated in the appended claims.

I claim:

1. In the fractionation of hydrocarbon oils, the process that comprises introducing the hydrocarbon vapors to be fractionated to a fractionating column wherein the vapors are subjected to fractionation, removing evolved vapors from the upper end of the fractionating column, passing said vapors to a reflux condenser wherein a portion thereof is condensed, passing the uncondensed vapors to a final condenser and collecting the resultant condensate from said vapors, cooling the condensate from the reflux condenser and conducting the cooled condensate to the upper portion of the fractionating column.

2. In the fractionation of hydrocarbon oils wherein vapors are taken off from a fractionating column and conducted to a final condenser to form a final condensate, the process that comprises subjecting the vapors from the column, before they reach said final condenser, to the action of a cooling medium to condense a portion thereof, applying a second cooling medium to the resultant condensate and introducing the cooled condensate to the upper portion of the fractionating column.

3. In the fractionation of hydrocarbon oils, the process that comprises introducing vapors to be fractionated into a fractionating column and subjecting the vapors therein to fractionation, subjecting the vapors evolved from said column to cooling to condense a portion thereof, separating the resultant condensate from the uncondensed vapors, applying a cooling medium to the condensate to thereby cool said condensate to a temperature materially below that of the temperature of its formation as a condensate, and conducting said condensate to the upper portion of the fractionating column as a reflux medium.

4. In apparatus for fractionating hydrocarbon oils, a fractionating column, a reflux condenser in vapor communication with said column, a conduit adapted to conduct liquid condensate from said reflux condenser to the upper portion of the fractionating column, means for applying a cooling medium to the conduit, a final condenser in vapor communication with the reflux condenser and means for collecting the condensate obtained in the final condenser.

5. In apparatus for fractionating hydrocarbon oils, a fractionating column, a reflux condenser in vapor communication with said column, a pair of conduits adapted to conduct liquid condensate from said reflux condenser to said fractionating column and means for cooling one of said conduits.

6. In the fractionation of hydrocarbon oils, the process that comprises subjecting hydrocarbon vapors to fractionation in a fractionating column, removing vapors from said column and subjecting them to cooling to condense a portion thereof, collecting the condensate thus formed, passing part of said condensate directly to the fractionating column, cooling another part of said condensate and passing the cooled condensate into said fractionating column.

7. In the fractionation of hydrocarbon oils, the process that comprises subjecting hydrocarbon vapors to fractionation in a fraction-tion in a fractionating column, taking o— ating column, taking off vapors from the column and conducting them to a final condenser for condensation while subjecting the vapors on their way to said final condenser to a cooling action to condense a portion thereof, cooling the condensate thus formed to a regulated and predetermined extent, and introducing the cooled condensate into the fractionating column.

8. In the manufacture of gasoline, the process that comprises passing mixed hydrocarbon vapors including components adapted for gasoline to a fractionating column wherein said vapors are subjected to fractionation, removing vapors comprising essentially gasoline components from the upper part of said column, subjecting said vapors to a partial condensing action to condense a portion thereof while conducting the uncondensed gasoline vapors to a final condenser, cooling the condensate formed by said partial condensing action to a regulated and predetermined extent, and introducing the cooled condensate to the fractionating column as a reflux condensate.

9. In the fractionation of hydrocarbon oils, the process that comprises introducing the hydrocarbon vapors to be fractionated into a fractionating column wherein the vapors are subjected to fractionation, removing evolved vapors from the upper end of the fractionating column, passing said vapors to a reflux condenser wherein a portion thereof is condensed, passing the uncondensed vapors to a final condenser and collecting the resultant condensate from said vapors, cooling the condensate from the reflux condenser to a regulated and predetermined extent, and conducting the cooled condensate to the upper portion of the fractionating column.

10. In the fractionation of hydrocarbon oils wherein vapors are taken off from a fractionating column and conducted to a final condenser to form a final condensate, the process that comprises subjecting the vapors from the column, before they reach said final condenser, to the action of a cooling medium to condense a portion thereof, applying a second cooling medium to the resultant condensate to cool said condensate to a regulated and predetermined extent, and introducing the cooled condensate to the upper portion of the fractionating column.

11. In the fractionation of hydrocarbon oils the process that comprises subjecting hydrocarbon vapors to fractionation in a fractionating column, removing vapors from said column and subjecting them to cooling to condense a portion thereof, collecting the condensate thus formed, passing part of said condensate directly to the fractionating column, cooling another part of said condensate to a regulated and predetermined extent, and passing the cooled condensate into said fractionating column.

In witness whereof I have hereunto set my hand this 27th day of Sept., 1932.

GUY B. BOGART.